United States Patent
Ito et al.

(10) Patent No.: US 6,804,389 B1
(45) Date of Patent: Oct. 12, 2004

(54) IMAGE FORMING APPARATUS

(75) Inventors: Tadayuki Ito, Tokyo (JP); Hitoshi Otani, Tokyo (JP); Nobuo Kochi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/556,781

(22) Filed: Apr. 25, 2000

(30) Foreign Application Priority Data

Apr. 26, 1999 (JP) .......................................... 11-118726

(51) Int. Cl.$^7$ ................................................ G06K 9/46
(52) U.S. Cl. ......................... 382/154; 434/92; 382/199; 382/276
(58) Field of Search ................................ 382/276, 154, 382/199; 345/964; 700/182; 434/92

(56) References Cited

U.S. PATENT DOCUMENTS

| | | | | |
|---|---|---|---|---|
| 5,101,475 A | * | 3/1992 | Kaufman et al. | 345/424 |
| 5,179,638 A | * | 1/1993 | Dawson et al. | 345/582 |
| 5,226,109 A | * | 7/1993 | Dawson et al. | 345/420 |
| 5,781,195 A | * | 7/1998 | Marvin | 345/428 |
| 5,900,878 A | * | 5/1999 | Goto et al. | 345/419 |
| 6,175,652 B1 | * | 1/2001 | Jacobson et al. | 382/216 |

OTHER PUBLICATIONS

Liu et al. "A Feature–Based Scheme for Reconstructing 3D Parts from 2D Orthographic Projections." IEEE Int. Workshop on Emerging Technologies and Factory Automation, Aug. 11, 1992, pp. 688–693.*

Baxes. "Digital Image Processing: Principles and Applications." John Wiley & Sons, Inc., 1994, pp. 346–347.*

* cited by examiner

*Primary Examiner*—Jon Chang
(74) *Attorney, Agent, or Firm*—Foley & Lardner LLP

(57) ABSTRACT

An orthogonally projected image forming unit 1 forms an orthogonally projected image based on a photographed image. A direction specifying unit 2 enables the orthogonally projected image to be seen from a different viewpoint, and forms an orthogonally projected image seen from a different viewpoint. A feature extracting unit 3 extracts a feature from the orthogonally projected image. A symbol pasting unit 4 pastes a symbol to a drawing during plotting. A display unit 5 displays the formed orthogonally projected image, the orthogonally projected image formed by changing a viewpoint, the orthogonally projected image processed by the image feature extracting unit 3, and the symbol pasted by the symbol pasting unit 4, and so on. An I/O unit 6 inputs/outputs various image data or three-dimensional coordinate data from a three-dimensional coordinate input de-vice such as a survey instrument or the like to the other device. Accordingly, plotting can be performed even for a spot unseen on an orthogonally projected image or a spot that has not been measured by forming the orthogonally projected image seen from the different viewpoint and pasting the symbol.

7 Claims, 8 Drawing Sheets

○ CONSTITUTION OF WHOLE SYSTEM

○CONSTITUTION OF WHOLE SYSTEM (A) STRAIGHT LINE
    EXTRACTION

| -1/2 | 1 | -1/2 |
|------|---|------|
| -1/2 | 1 | -1/2 |
| -1/2 | 1 | -1/2 |

(B) LINE DETECTING
    OPERATOR (C) STRAIGHTLINE
    EXTRACTION

CONTOUR EXTRACTION (A) TWO-DIMENSIONAL SYMBOL (B) THREE-DIMENSIONAL SYMBOLS

IMAGE FORMING APPARATUS

BACKGROUND OF THE INVENTION

The present invention relates to an image forming apparatus, and more particularly to an image forming apparatus capable of facilitating plotting (stereo-plotting) by forming an orthogonally projected image from a centrally projected image with a device for plotting the field to be measured or inputting an orthogonally projected image which has been already obtained into the device. The invention further relates to an image formation apparatus capable of performing stereoscopic verification or simulation for a current situation by plotting the site to be measured not two-dimensionally but three-dimensionally, compensating for a section not seen on the orthogonally projected image or a spot not measured three-dimensionally, and also by enabling the orthogonally projected image to be seen from a different viewpoint. Note that in this specification of this application, "photograph" shall contain a wide concept such as "acquire digital image," "detect digital image" and "take a picture."

In the related art, a drawing obtained by surveying a site to be measured has been prepared by paper and a pen, or the like, typically used in plane table surveying. In recent years, a line drawing has been made for a site to be measured by a combination of a survey instrument and a portable computer, typically used in a pen-based mapping system. In such a conventional pen-based mapping system, plotting has been carried out by using the survey instrument such as a total station, a global positioning system (GPS) or the like to make a line drawing on the portable computer. Actual plotting of the site to be measured was carried out by going to the site and viewing its current situation, alternatively in an office by watching photographs taken at the site. In aerial photographs, plotting was made from a stereo photographing image by using an analytic plotting instrument or the like.

SUMMARY OF THE INVENTION

Conventionally, however, only a two-dimensional line drawing has been made in the case of plotting in the actual site by means of the pen-based mapping system. Also, in the conventional case of plotting by bringing the photographs back to the office, the plotting has been carried out by means of collation with the photographs of the actual situation. In this case, however, there has not always been one-to-one correlation between the drawings and the photographs, which has resulted in the difficulty of plotting while verifying, the impossibility of spot identification or other problems. Further, the prepared drawings have been all two-dimensional and thus three-dimensional verification has been impossible. Consequently, the actual site has had to be imagined by watching the photographs taken from different angles.

In addition, in the conventional case of plotting based on aerial photographs, plotting has been carried out by using the analytic plotting instrument or the like. In this case, however, operational skills were needed, and thus the plotting was not easily carried out by anybody. Further, in the conventional case of plotting from the orthogonally projected images, spots unseen or not measured were difficult to be plotted.

With the foregoing problems in mind, an object of the present invention is to provide an image forming apparatus capable of facilitating plotting for anybody by pasting an image in the case of plotting a site to be measured, and also enabling a situation of the site to be seen from a different viewpoint by performing plotting by pasting a three-dimensional symbol even for a spot unseen on an orthogonally projected image or a spot that has not been measured. Another object of the present invention is to provide an image forming apparatus capable of not only supporting plotting but also verification or even virtual/stereoscopic simulation for a current situation of a site to be performed from various angles by drawing an orthogonally projected image from a different viewpoint.

Yet another object of the present invention is to provide an image forming apparatus capable of easy plotting by preparing an orthogonally projected image, a sharpened image and an edge image or an image combining these images, displaying the images and then only tracing a screen. The plotting is easily performed also by carrying out various image processing operations for semi-automatic line extraction, contour extraction or the like, and then registering and disposing a symbol.

Yet further object of the present invention is to provide an image forming apparatus enabling automatic plotting to be performed by using a template matching technology, and capable of facilitating plotting for anybody.

One of the features of the present invention is a simplified plotting, which is realized by forming an orthogonally projected image from an image of a site to be plotted. Another feature of the present invention is a plotting support, which is given by performing image processings such as sharpening, edge extracting and the like using the obtained orthogonally projected image. In this case, drawing is simplified by performing automatic plotting depending on an object to be plotted. Yet another feature of the present invention is easy verification as well as drawing for a current situation of a site, which are simultaneously performed by prestoring two-dimensional and three-dimensional symbols having predetermined shapes, sizes and the like, so as to enable a spot unseen on the orthogonally projected image or a spot that has not been measured to be plotted and seen on the orthogonally projected image from a different viewpoint.

According to solving means of the present invention, an image forming apparatus is provided, which comprises:
  a direction specifying unit for specifying a direction of forming an orthogonally projected image; and
  an orthogonally projected image forming unit for forming a first orthogonally projected image based on image data and its three-dimensional data, and forming a second orthogonally projected image seen from a different viewpoint from the direction specified by the direction specifying unit based on the image data and this three-dimensional data.

In accordance with the present invention, the image forming apparatus may further comprise: a symbol pasting unit for pasting a specified symbol to a position of an object appearing in the orthogonally projected image formed by the orthogonally projected image forming unit, the symbol being indicative of the object.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Next, description will be made for the preferred embodiments of the present invention with reference to the accompanying drawings below.

(1) Summary of Constitution and Operation

Figure 1:
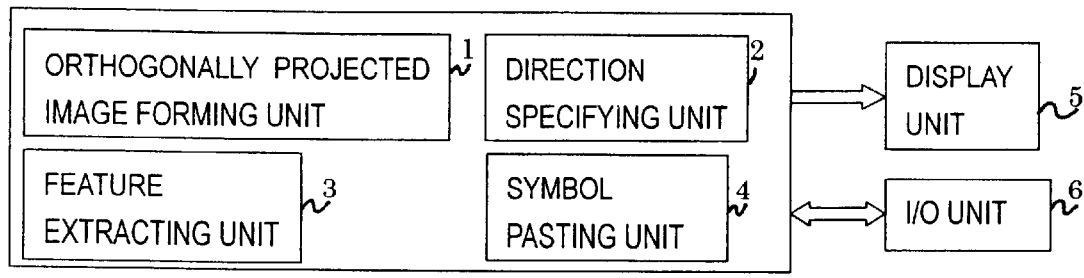
FIG. 1 is a diagram showing a constitution of an image forming apparatus of the present invention.

FIG. 1 is a diagram showing a constitution of an image forming apparatus of the present invention.

This image forming apparatus can provide plotting support by using an orthogonally projected image, and comprises an orthogonally projected image forming unit 1, an direction specifying unit 2, a feature extracting unit 3, and a symbol pasting unit 4. The image forming apparatus may further comprise a display unit 5 and an I/O unit 6.

The orthogonally projected image forming unit 1 forms an orthogonally projected image based on a photographed image as a centrally projected image having a control point photographed therein. The direction specifying unit 2 specifies the orthogonally projected image such that the image can be seen from different viewpoint, and forms an orthogonally projected image to be seen from a different viewpoint by the orthogonally projected image forming unit 1. The feature extracting unit 3 extracts an edge, a straight line, a curved line or other features from the orthogonally projected image. The symbol pasting unit 4 prestores two-dimensional and three-dimensional symbols having predetermined shapes and sizes, and pastes a proper symbol to a drawing during plotting.

The display unit 5 performs two-dimensional displaying or three-dimensional displaying on a CRT, a liquid crystal display, a plasma display or the like. The display unit 5 displays the formed orthogonally projected image, the orthogonally projected image formed by changing the viewpoint, the orthogonally projected image processed by the feature extracting unit 3, the symbol pasted by the symbol pasting unit 4, and so on. The I/O unit 6 inputs/outputs various image data, three-dimensional coordinate data or the like from a three-dimensional coordinate input device such as a survey instrument or the like to the other device. As the I/O unit 6, various I/O devices are available. For example, one may be selected from an optical disk device, a card storage medium (HDD, memory or the like), a floppy disk, a keyboard, a pen, a mouse, a terminal, a CD-ROM disk drive, and so on.

Figure 2:
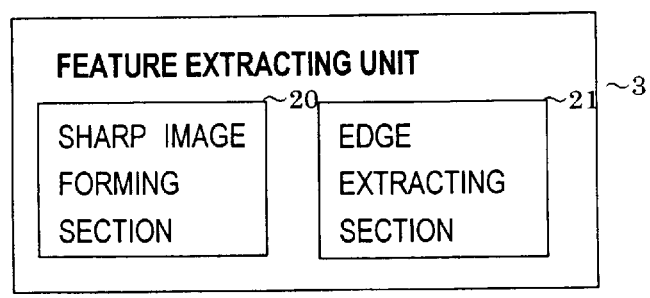
FIG. 2 is a diagram showing a constitution of a feature extracting unit.

FIG. 2 is a diagram showing a constitution of the feature extracting unit. As shown in the drawing, the feature extracting unit 3 includes a sharp image forming section 20 and an edge extracting section 21. The sharp image forming section 20 forms a sharpened orthogonally projected image for plotting support. The edge extracting section 21 extracts a specified feature regarding an edge, a straight line, a curved line or the like.

Figure 3:
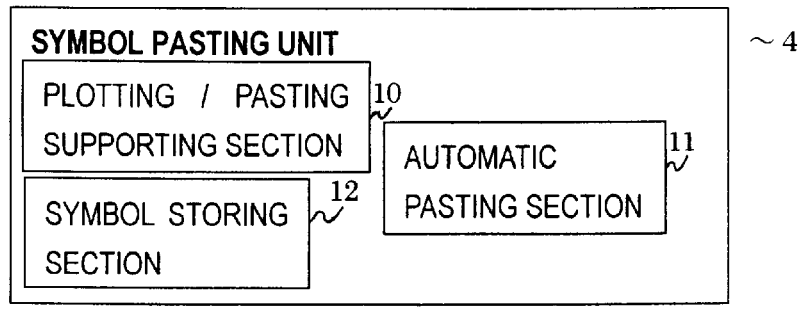
FIG. 3 is a diagram showing a constitution of a symbol pasting unit.

FIG. 3 is a diagram showing a constitution of the symbol pasting unit. The symbol pasting unit 4 includes a plotting/symbol pasting supporting section 10, an automatic pasting section 11 and a symbol storing section 12. The plotting/pasting supporting section 10 gives a plotting support by performing displaying overlapping an orthogonally projected image, a sharp image, an edge image, and so on, symbol pasting, or the like. The automatic pasting section 11 performs automatic disposing and pasting a symbol or the like based on matching, positioning or the like. The symbol storing section 12 stores two-dimensional and three-dimensional symbols.

The foregoing units and means can be realized by using, for example, a portable computer (PC), and details on these sections and means will be described later. Also, these sections and means can constitute an image forming apparatus capable of supporting plotting based on an orthogonally projected image as described below.

Figure 4:
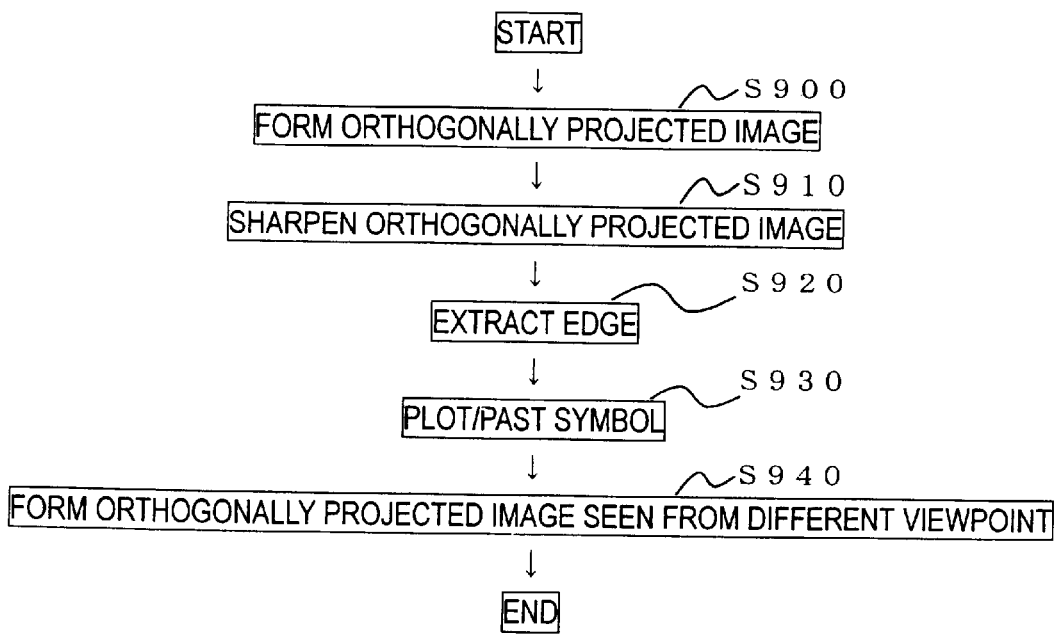
FIG. 4 is a flowchart of an image forming processing according to the present invention.

Next, description will be made in outline for processing of the present invention. FIG. 4 is a flowchart of an image forming processing of the present invention.

First, in an actual site, by using the survey instrument, a digital camera, the portable computer, and so on, an orthogonally projected image is formed by the orthogonally projected image forming unit 1 based on a photographed image as a centrally projected image having a control point photographed therein (step S900). Alternatively, formation of an orthogonally projected image is carried out by using an aerial photograph and land coordinates (three-dimensional coordinates) obtained by a control point survey, or the like. Otherwise, a commercially available orthogonally projected image may be obtained. In this case, however, the land coordinates obtained by surveying the control point photographed in an image must also be obtained. Unless specified otherwise, a standard orthogonally projected image is one, which has been obtained based on an image photographed from a viewpoint of a vertical direction or a slightly oblique direction from the vertical direction. But an image photographed from the other direction such as a horizontal direction may also be used. Further, a photographing direction may be specified beforehand by the direction specifying unit 2, or standard data containing a set direction which is prestored may be used.

Subsequently, a sharpened orthogonally projected image is formed for plotting support by the sharp image forming section 20 of the feature extracting unit 3 (step S910). Further, edge extraction is performed by the edge extracting section 21 of the feature extracting unit 3 (step S920). By using these formed images, symbol pasting or plotting is performed by the symbol pasting unit 4 (step S930).

Generally, since the formed orthogonally projected image reflects a dimension, a line drawing can be made only by tracing the image. This is enough to support plotting. Further, in accordance with the present invention, in the feature extraction unit 3, sharpening is performed for the image by the sharp image forming section 20 (step S910), and edge extraction is performed by the edge extracting section 21 (step S920). These operations are carried out for plotting support. In the symbol pasting unit 4, plotting support is performed by carrying out the plotting or the automatic plotting by symbol pasting. Accordingly, the plotting support can be performed for a proper image such as the orthogonally projected image, the sharpened orthogonally projected image, the edge image, an image combining the edge image and the orthogonally projected image, an image combining the edge image and the sharpened orthogonally projected image or the like.

For the orthogonally projected image formed in the foregoing manner, if drawn by changing a viewpoint, an unseen spot or a spot that has not been measured can be expressed based on a registered three-dimensional symbol. Further, if the symbol is virtually disposed, in addition to various reproductions of a situation of the actual site, simulation or the- like can be performed (step S940). Step S940 may be omitted.

(2) Orthogonally Projected Image Forming Processing (Step S900)

Figures 5, 6:
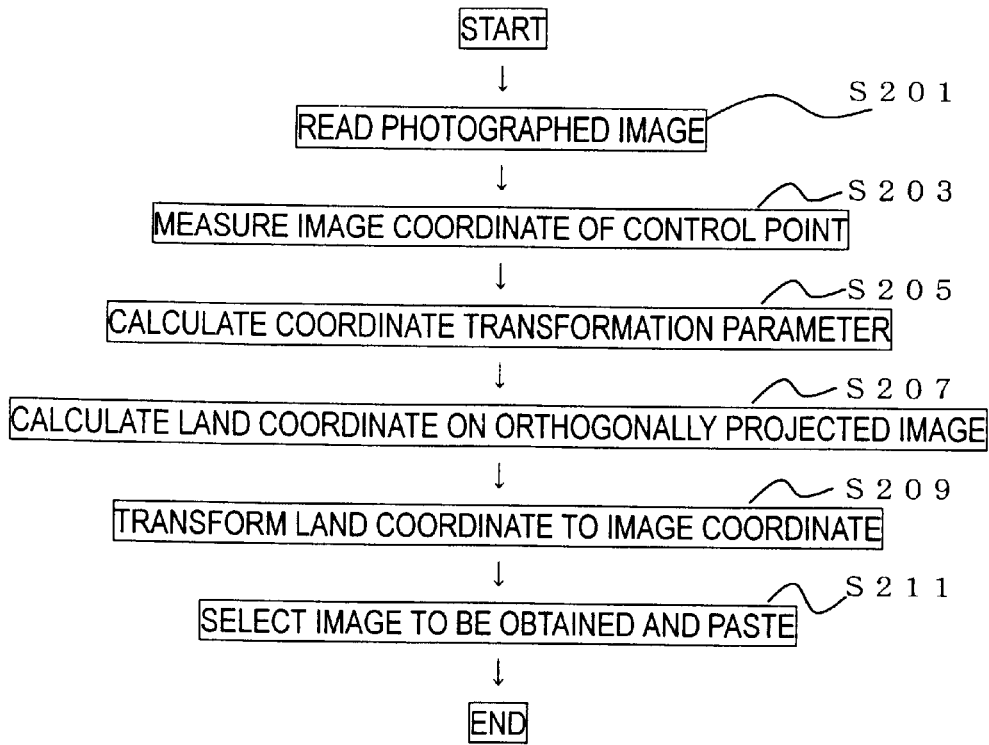
FIG. 5 is a flowchart of an orthogonally projected image forming processing.
FIG. 6 is an explanatory view showing an example of Laplacian operator.

Next, description will be made in detail for the formation of an orthogonally projected image (step S900) by the orthogonally projected image forming unit 1. FIG. 5 is a flowchart of an orthogonally projected image forming processing.

First, to form an orthogonally projected image, a photographed image is read (step S201). Then, measuring is performed by setting image coordinates of several control point counts (e.g., 6 points or more) photographed-in on the photographed image as three-dimensional data (step S203). The photographed-in control point data contains land coordinates measured beforehand by the survey instrument or the like. Subsequently, correlation is taken between the image coordinates and the land coordinates to obtain a coordinate transformation parameter (step S205). This parameter is calculated by the following three-dimensional projective transformation formula.

$$x = \frac{L_1 X + L_2 Y + L_3 Z + L_4}{L_9 X + L_{10} Y + L_{11} + 1}$$

$$y = \frac{L_5 X + L_6 Y + L_7 Z + L_8}{L_9 X + L_{10} Y + L_{11} Z + 1}$$

wherein, (x, y): image coordinates
(X, Y, Z): land coordinates
$L_1$ to $L_{11}$: unknown variable When the formula is solved based on the control point data by using a least squares method, various transformation parameters can be obtained to determine a relationship between the image coordinates (x, y) and the three-dimensional coordinates (X, Y, Z).

Subsequently, land coordinates of pixels on the orthogonally projected image are calculated for (step S207). In this step, to form an orthogonally projected image, the image coordinates (x, y) of the orthogonally projected image are transformed into land coordinates (X, Y, Z). The land coordinates (X, Y, Z) are calculated by the transformation parameters previously obtained in step S205 for the coordinate transformation parameter calculation processing. In other words, the land coordinates (X, Y, Z) correlated to the image coordinates (x, y) of the orthogonally projected image are obtained by the following formula. As such, a position obtained for each pixel on the orthgonally projected image can be calculated.

$$X = X_0 + x\Delta X$$

$$Y = Y_0 - y\Delta Y$$

$$Z = -\frac{aX + bY + d}{c}$$

wherein, $(X_0, Y_0)$: position on the upper left of the orthogonally projected image in the land coordinate system $(\Delta X, \Delta Y)$: size of one pixel in land coordinate system (e.g., m/pixel)

(x, y): image coordinates of the orthogonally projected image (X, Y, Z): land coordinates (three-dimensional coordinates)

a, b, c, d: coefficients of plane equation formed based on a plurality of control points interpolating given image coordinates (x, y)

Next, by using the transformation parameters obtained in step S205, an image coordinates (x, y) are calculated, which are correlated to the land coordinates (X, Y, Z) obtained by the formula 1 in step S207 (step S209). From the image coordinates (x, y) thus calculated, a gray value on the land coordinates (X, Y, Z) of a concerned image is obtained. This gray value means a density of a pixel in a two-dimensional position (X, Y) on the orthogonally projected image. Accordingly, a density of an image to be pasted to the position (X, Y) on the land coordinates can be obtained. By performing the above-described processings for all the pixels of the orthogonally projected image, image pasting is carried out (step S211). Although the image pasting based on the image density has been described, no limitation should be placed in this regard, and image pasting can be performed by obtaining proper information on colors, designs or the like.

(3) Image Sharpening Processing (Step S910)

Next, description will be made in detail for the image sharpening processing (step S910) performed by the feature extracting unit 3. Since this processing sharpens an image to form an image emphasizing a contour, manual plotting can be easier than tracing on a normal image.

A sharpened image can be obtained by, for example, executing processing such as Laplacian filtering, Laplacian Gaussian filtering or the like for the orthogonally projected image formed in step S900, forming a blurred image and then subtracting the blurred image from the original orthogonally projected image. In the sharp image forming section 20 of the feature extracting unit 3, the following arithmetic operation is performed to form a sharp image.

$$g(i, j) = f(i, j) - \nabla^2 f(i, j)$$

wherein, g(i, j): sharpened image
f(i, j): input image
$\Delta^2 f(i, j)$: Laplacian of the input image Regarding $\Delta^2 f(i, j)$, various types of differential operators are available.

FIG. 6 is an explanatory view showing an example of Laplacian operator. Gaussian operator may also be added to this Laplacian operator. But the operators are not limited to the foregoing, and a proper operator can be selected and used. With the processing described above, a sharp image can be obtained. Various other methods of obtaining sharp images can be used.

Other than by the foregoing digital method, the sharp image may be obtained by calculation represented by the following formula. The formula includes Gaussian calculation.

$$\nabla^2 G(x, y) = \frac{x^2 + y^2 - 2\sigma^2}{2\pi\sigma^6} \exp(-(x^2 + y^2)/2\sigma^2)$$

$\sigma$: Parameter of Gauss function

In this case, a difference is calculated by the following formula.

$$g(x, y) = f(x, y) - \nabla^2 G(x, y)$$

wherein, g(x, y): sharpened image f(x, y): input image $\Delta^2 G(x, y)$: Laplacian Gaussian operator of input image During photographing, identical images may be photographed in a focused state (equivalent to f(x, y) of the foregoing formula) and in an unfocused state (equivalent to $\Delta^2 G(x, y)$ of the foregoing formula). This is permitted because a similar effect can be provided by obtaining an image of a difference therebetween.

(4) Edge Extraction Processing (Step S920)

Next, description will be made for edge extraction processing from the sharpened image by the edge extracting section 21 of the feature extracting unit 2 (step S920).

The edge extraction processing (step S920) can be performed by, for example, setting a zero crossing point of a gray value of the previously obtained sharpened image as an edge. Specifically, only a zero point is formed into an image. Alternatively, an image is formed by, for example, coloring a plus area white and a minus area black with zero as a border. Plotting is also enabled by displaying this edge-extracted image and by means of specifying with a pointing device (an input device, e.g., a pen, a mouse or the like). By overlapping the edge image and the orthogonally projected image, or the edge image and the sharpened image, an image emphasizing the edge more can be formed and displayed.

(5) Plotting/Symbol Pasting Processing (Step S930)

Plotting/symbol pasting is performed by the symbol pasting unit 4 based on the orthgonally projected image, the sharpened image and the edge image that have been formed in the foregoing manner, an image combining the edge image and the orthogonally projected image, an image combining the edge image and the sharpened orthgonally projected image or the like (step S930).

Plotting supporting functions by the symbol pasting unit 4 may be selected from the following.

1. Plotting support by displaying the orthogonally projected image, the sharp image and the edge image, or overlapped displaying with the edge image (especially, by the plotting/pasting supporting section 10);
2. Straight line extraction support (especially, by the plotting/pasting supporting section 10);
3. Contour extraction support (especially, by the plotting/pasting supporting section 10);
4. Plotting by symbol registration (especially, by the symbol storing section 12); and
5. Automatic plotting for symbols (matching, positioning) (especially, by the automatic pasting section 11).

In the plotting support of 1, an image easy to be plotted selected from the foregoing orthogonally projected image, the sharpened image, the edge-extracted image, the image combining the edge-extracted image and each image, and so on, is displayed by the display unit 5. Then, the plotting is carried out by specifying or tracing the displayed image using the input device such as a pen or the like. Since for example a contour portion is emphasized in the sharpened image, the edge image or the overlapped image with the edge image, a spot to be plotted is clear-cut. As a result, work is facilitated. The work itself is very simple because tracing the image is only necessary.

Next, description will be made for the straight line extraction support of 2. In this case, plotting is performed by specifying an edge starting point and an end point with the pointing device and then extracting the edges of these portions automatically. In the case of a precise straight line, as it is only necessary to connect specified spots by a straight line, the following processing is not necessary. Thus, the case of processing for extracted portions between the two when these two points are not connected by a precise straight line is described below.

Figure 7:
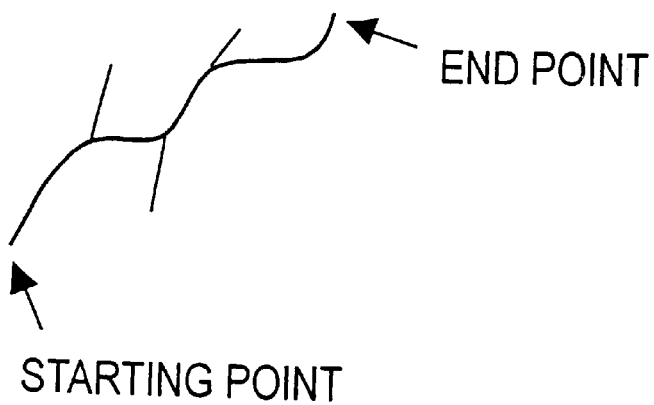
FIGS. 7(A) to 7(C) are explanatory views, each of which illustrates straight line extraction.
Figure 7:
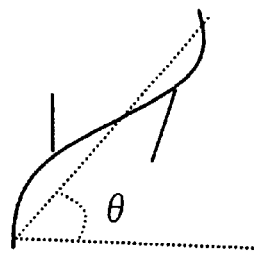

FIGS. 7(A) to 7(C) are views, each of which illustrates straight line extraction. For example, as shown in FIG. 7(A), an extracted edge image is displayed and, by specifying its starting and end points, plotting is obtained therebetween (see a thick line). Alternatively, in the case of displaying the orthogonally projected image or the sharpened image and specifying its starting and end points, edge tracing processing may be performed by means of line detection using a line detecting operator from the starting point. For the line detecting operator, for example, one may be selected from an operator like that shown in FIG. 7(B) and others as occasion demands. A border line of an object can be extracted by using such an operator to form a differential image and sequentially connecting pixels having high differential values.

Also, when selecting candidates of the pixels having high differential values, the use of a sum of curvatures or an average value enables semi-automatic extraction to be performed. For example, for a likely edge candidate, starting and end points and a line direction are specified to select the edge best matching its direction. Accordingly, an edge can be automatically extracted. FIG. 7(C) shows an example of an edge specified based on line inclination θ. Such processing is performed and, if the extracted edge is proper to the drawn image, then it is considered as a completed plotted line. If there are many noises or the like and extraction is difficult, then a line is selected by displaying edge candidates on the image. If there are many noises or the like and extraction is difficult, plotting is performed by repeating such a specifying operation.

Figure 8:
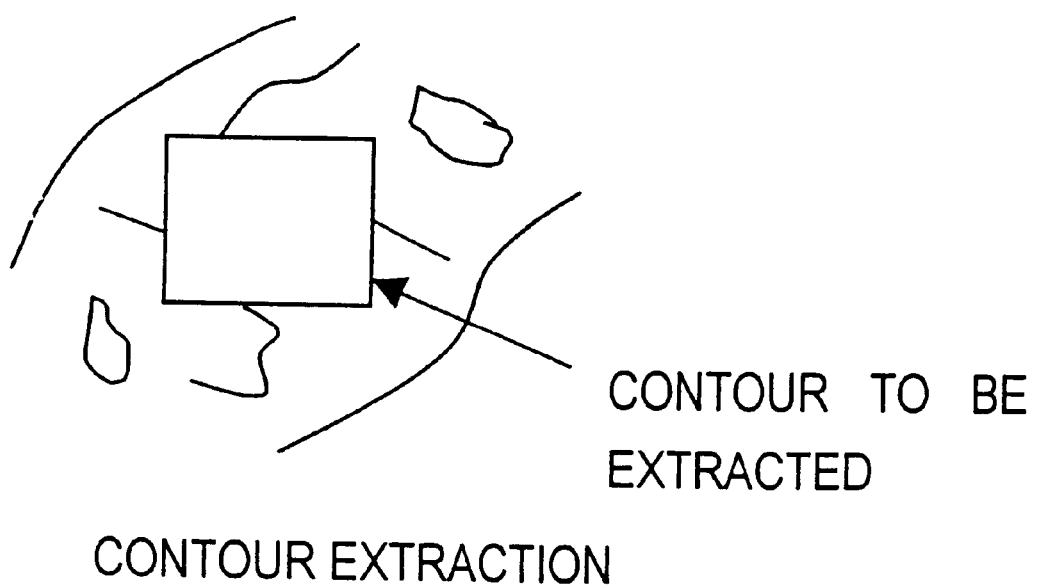
FIG. 8 is an explanatory view illustrating contour extraction.

Next, description will be made for the contour extraction of 3. FIG. 8 is a view illustrating contour extraction. As shown in the drawing, in the case of a contour line, specifying is performed to this effect. Normally, since an edge image extracted by filtering is a contour line, this image is selected and, if proper, it is considered as a plotted image. However, there may be a case where a contour line is not provided because of noises or an actually seen image. In this case, a line is selected by displaying edge candidates on the image. If there are many such edges, plotting is performed by repeating such a specifying operation.

Figure 9:
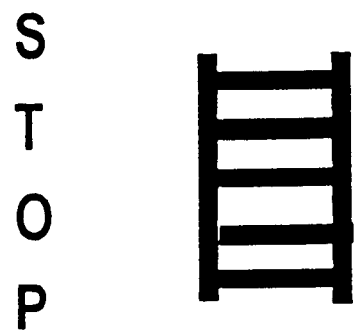
FIGS. 9(A) and 9(B) are explanatory views, each of which shows a symbol.
Figure 9:
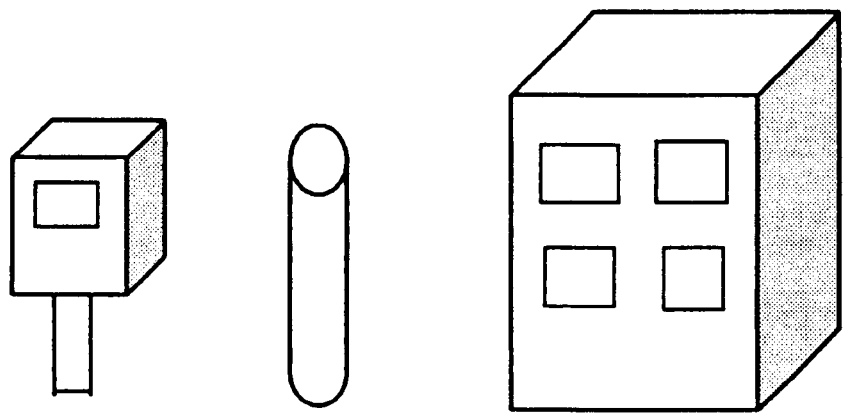

Next, description will be made for plotting based on the symbol registration of 5. There are two-dimensional and three-dimensional symbols. FIGS. 9(A) and 9(B) are views, each of which shows a symbol. For example, to plot a road or the like, sizes, shapes or the like of characters of a pedestrian crossing, a stop line, a manhole and a stop are predetermined in most cases, and these are two-dimensional symbols (FIG. 9(A)). Sizes, shapes or the like of a mailbox, a utility pole, a sign, and so on, are predetermined, and these are three-dimensional symbols. Sizes of a house, a building, a wall, and so on, are not predetermined, but these are three-dimensional symbols. A cube, a column, a cone, a truncated pyramid and other basic figures are also three-dimensional symbols (FIG. 9(B)). The symbol storing section 12 of the symbol pasting unit 4 stores sizes, shapes or the like regarding these symbols two-dimensionally or three-dimensionally. For the symbols having predetermined sizes, shapes or the like, an image seen from each direction can be specified beforehand. By manually bringing the symbols to a position of an orthogonally projected image while displaying the same, plotting can be easily performed without tracing on the image.

Figure 10:
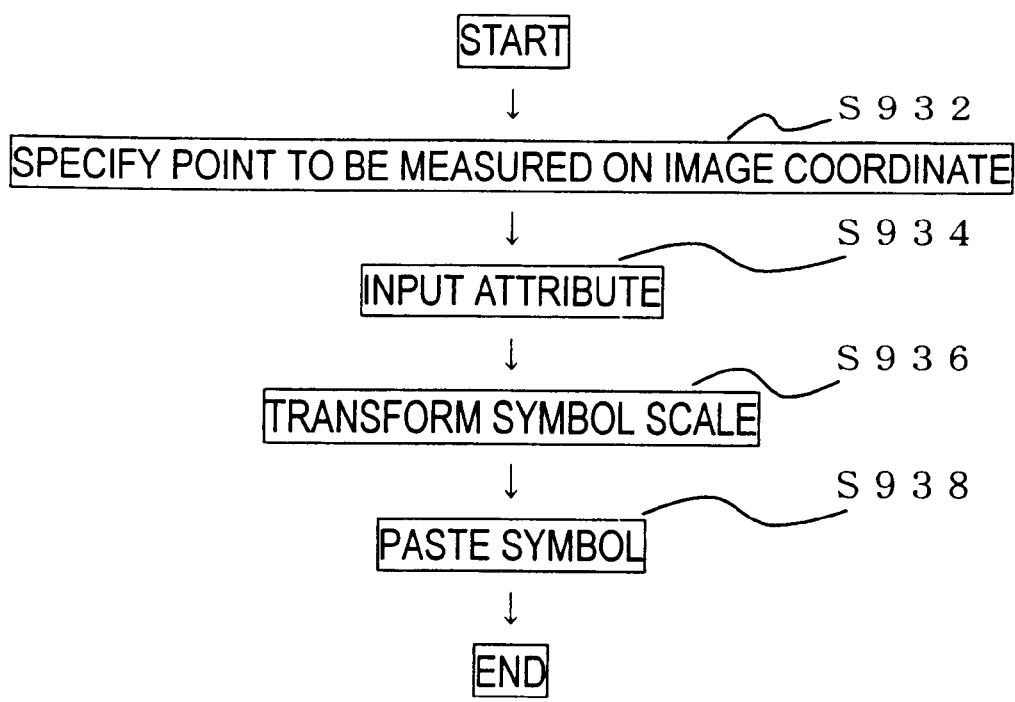
FIG. 10 is a flowchart of a symbol pasting processing.

FIG. 10 is a flowchart of a symbol pasting processing. Drawing can be performed even when a viewpoint is changed by pasting a symbol in the following procedure.

Figure 11:
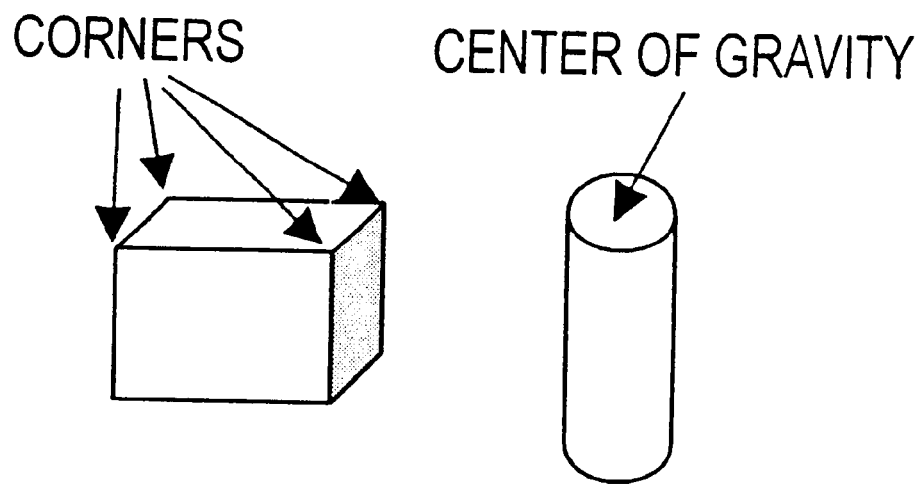
FIG. 11 is an explanatory view showing "corners" and a center of gravity.

First, a point to be measured on the image is specified by the pen or the mouse (step S932). Based on registered symbols, for example, a point of only a center of gravity or two or four points of "corners" may be specified. FIG. 11 is a view showing "corners" and a center of gravity. Accuracy of such specifying can be further increased if the center of gravity or "the corners" have been measured three-dimensionally by the survey instrument. Accordingly, depending on an object to be measured, correlation may be made with a coordinate of a position of the center of gravity and "the corners" that have been measured by the survey instrument.

Subsequently, to form an orthogonally projected image seen from a different viewpoint in step S940, for example, a position of a symbol is transformed from an image coordinate into a land coordinate, the symbol is registered in a position on the land coordinate, during formation of an orthogonally projected image, orthogonally projected image pasting and symbols pasting seen from its direction are simultaneously performed.

Although not necessary if a land coordinate of the symbol is known, by the survey instrument or the like, a point on the image coordinate must be transformed into one on the land coordinate based on the following formula.

$$X' = (Z - Z_0) \frac{a_{11}x + a_{21}y - a_{31}c}{a_{13}x + a_{23}y - a_{33}c} + X_0$$

$$Y' = (Z - Z_0) \frac{a_{12}x + a_{22}y - a_{32}c}{a_{13}x + a_{23}y - a_{33}c} + Y_0$$

Subsequently, an attribute of the symbol identification is entered (step S934).

For the attribute, proper identification information, for example, a sign, a building, a wall, a landmark, a drawing on the road or the like, may be used. Regarding such a sign or other symbols, a size, a shape or the like of the symbol is subjected to transformation in matching with a scaled-down or a measured coordinate value (step S936). If known, a height is also entered. If there is no entry of a height, then a default value is entered. If no specific symbols exist or are matched, then a basic figure such as a cube or the like may be entered. In this case, a dummy object is formed. Then, after a size, a shape or the like of a symbol therefor is determined, the symbol is pasted to a position of its land coordinate (step S938). Then, when necessary, an orthogonally projected image is formed by providing a viewpoint (step S900, S940). For such a symbol, during formation of the orthogonally projected image seen from a viewpoint specified by the direction specifying unit 2, the symbol is transformed into one having an angle seen from the same viewpoint and then pasted.

With the foregoing processing, even an unseen portion or a portion that has not been measured can be drawn or plotted by disposing a three-dimensionally expressed symbol, and drawing can be performed by changing a viewpoint. Moreover, even if such an object does not exist in actuality, three-dimensional simulation can be performed by virtually disposing a symbol thereof.

Next, description will be made for an example of automatic plotting/symbol disposition performed by the automatic pasting section 11 of the symbol pasting unit 4.

Automatic plotting is carried out by using a template matching technology to search one similar to a symbol on the image and dispose the symbol in a place where the similar symbol has been found. Matching is carried out, for example, in the edge extracted image. Since the edge extracted image is a binary image, a quantity of information is smaller than that of a gray level image, and no unnecessary information is provided. Accordingly, high-speed matching is assured.

A specific procedure of automatic plotting/symbol disposition is as follows.

1. First, a symbol having a predetermined size, shape or the like (e.g., see FIG. 9) is registered as a template.
2. Then, a dimension of the symbol is transformed to match a reduction scale of an orthogonally projected image (calculation).
3. Subsequently, an area to be automatically plotted is specified.
4. For the specified area, template matching is performed based on the template image (calculation: see formula 5 below).
5. The registered symbol is overlapped and pasted on a correlated place on the image.
6. If the automatic plotting/symbol disposition is proper, then the processing is completed.

The template matching of the foregoing step 4 is described below. For the template matching, any selected from normalized cross correlation, Sequential Similarity Detection Algorithm (SSDA), and so on may be used. The use of SSDA enables a processing speed to be high. Here, this detection method is described.

First, a formula of SSDA is shown below. A point having least residual R (a, b) is an image position to be obtained. To achieve a high speed for processing, in the foregoing addition, calculation is performed in such a way as to suspend the addition when a value of R (a, b) exceeds a past least value of residual and move to a next value (a, b).

$$R(a, b) = \sum_{mI=0}^{NI-1} \sum_{nI=0}^{NI-1} |I_{(a,b)}(m_1, n_1) - T(m_1, n_1)|$$

$T(m_1, n_1)$: template image, $I_{(a,b)}(m_1, n_1)$: partial image of object image, (a, b): upper left coordinate of template image, R (a, b): residual In the foregoing, the edge image was used. But the foregoing processing can be performed by using the orthogonally projected image, the sharpened image, the image combining the edge image with each image or the like. In this case, a symbol to be registered should be a gray level image, which is obtained by performing gray level processing. In the case of the image plotted in such a manner, even an unseen portion or a spot, which has not been measured enough, can be seen by preparing symbols even when a viewpoint is changed three-dimensionally.

(6) Formation of Orthogonally Projected Image Seen from Different View-point (step S940).

Next, description will be made for formation of an orthogonally projected image seen from a different viewpoint.

Figure 12:
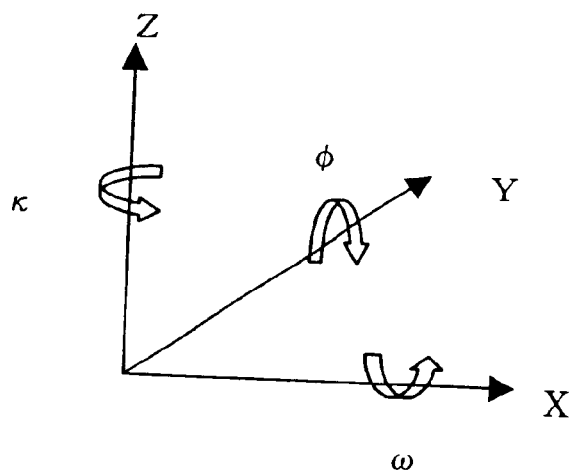
FIG. 12 is an explanatory view showing rotations in a coordinate system.

In this process, as an example, the orthogonally projected image forming unit 1 rotates a coordinate system in a direction specified by the direction specifying unit 2 to form an orthogonally projected image. FIG. 12 is a view showing rotations of the coordinate system. Specifically, as shown in the drawing, a land coordinate system of X', Y' and Z' changed in viewpoint is obtained by respectively rotating X, Y and Z of the land coordinate system in proper axial directions ω, φ and κ. Orthogonally projected image formation (S900) is performed therefor to form an orthogonally projected image.

The detail is as follows. For example, assuming that a coordinate in an opposite land coordinate of X', Y' and Z' having inclination is P' (X', Y', Z'), which is taken by an object P (X, Y, Z) represented by a land coordinate system X, Y and Z having no inclination, the coordinate can be obtained by the following formula.

$$\begin{pmatrix} X' \\ Y' \\ Z' \end{pmatrix} = \mathcal{R}^{-1} \begin{pmatrix} X - X_0 \\ Y - Y_0 \\ Z - Z_0 \end{pmatrix}$$

$$\mathcal{R} = \mathcal{R}_\omega \mathcal{R}_\phi \mathcal{R}_\kappa$$

$$\mathcal{R}^{-1} = \mathcal{R}^t \begin{pmatrix} a_{11} & a_{21} & a_{31} \\ a_{12} & a_{22} & a_{32} \\ a_{13} & a_{23} & a_{33} \end{pmatrix}$$

$(X_0, Y_0, Z_0)$: coordinates of center of projection $a_{31}$=sin ω sin κ−cos ω cos φ cos κ

$a_{32}$=sin ω cos κ+cos ω sin φ sin κ

$a_{33}$=cos ω cos φ

$a_{21}$=cos ω sin κ+sin ω sin φ sin κ

$a_{22}$=cos ω cos κ−sin ω sin φ sin κ

$a_{23}$=−sin ω cos φ

$a_{11}$=cos φ cos κ, $a_{12}$=−cos φ sin κ, $a_{13}$=sin φ

Hereupon, by performing orthogonally projected image forming processing similar to that in step S900 by the orthogonally projected image forming unit 1 for each of X', Y' and Z' obtained by the coordinate transformation, an orthogonally projected image seen from a different viewpoint can be obtained. The formed orthgonally projected image is displayed on the display unit 5.

What is claimed is:

1. An image forming apparatus comprising:

a specifying unit for specifying a direction and angle of forming an orthogonally projected image from a photographed image;

a forming unit for forming a first orthogonally projected image based on photographed image data and its three-dimensional data as a centrally projected image, and forming a second orthogonally projected image seen from a different viewpoint using the direction and angle specified by the specifying unit by transforming the first orthogonally projected image based on the image data and the three-dimensional data; and a pasting unit for pasting a three-dimensional symbol to a position of an object appearing in the first orthogonally projected image formed by the forming unit, the symbol being indicative of the object, wherein the forming unit transforms, during formation of the second orthogonally projected image, the three-dimensional symbol seen from the different viewpoint using the direction and angle for the second orthogonally projected image specified by the specifying unit, and the pasting unit pastes the transformed three dimensional symbol to the second orthogonally projected image.

2. An image forming apparatus according to claim 1, wherein said photographed image is generated by a digital camera.

3. An image forming apparatus according to claim 2, wherein said symbol pasting unit pastes the symbol in a manner of seeing the object from the direction specified by the specifying unit based on a prestored symbol.

4. An image forming apparatus according to claim 1, further comprising:

a feature extracting unit for extracting a specified feature from one of the orthogonally projected images formed by the forming unit.

5. An image forming apparatus according to claim 4, wherein said feature extracting unit extracts any one, alternatively a plurality, of an edge portion, a straight line portion, a contour portion and a specified shape indicative of the object in the orthogonally projected image as specified features.

6. An image forming apparatus according to claim 4, wherein said feature extracting unit includes a sharp image forming section for forming a sharp image by forming a blurred image and subtracting the blurred image from the original orthogonally projected image.

7. An image forming apparatus according to claim 4, wherein said pasting unit pastes a symbol based on a position of the specified feature extracted by the feature extracting unit.

* * * * *